United States Patent [19]
Dale

[11] 3,732,463
[45] May 8, 1973

[54] GROUND FAULT DETECTION AND INTERRUPTION APPARATUS

[75] Inventor: Brian Dale, Lynnfield, Mass.

[73] Assignee: GTE Laboratories Incorporated, Bayside, N.Y.

[22] Filed: Jan. 3, 1972

[21] Appl. No.: 215,020

[52] U.S. Cl. ............................317/18 D, 317/27 R
[51] Int. Cl. ................................................H02h 3/26
[58] Field of Search .........................317/18 D, 27 R

[56] References Cited

UNITED STATES PATENTS 3,555,360  1/1971  Lee et al............................317/18 D
3,638,072  1/1972  Kobayashi et al. ................317/18 D

*Primary Examiner*—James D. Trammell
*Attorney*—Irving M. Kriegsman

[57] ABSTRACT

An apparatus for detecting a ground fault and for interrupting the supply of electrical energy upon detection of a fault is disclosed comprising a means for establishing a magnetic flux, $\phi_d$, which is representative of the difference in current flowing between two conductors, a means for establishing a reference magnetic flux, $\phi_r$, and means for sensing when $\phi_d$ exceeds $\phi_r$ and for interrupting the application of electrical energy to a utility device when $\phi_d$ exceeds $\phi_r$.

6 Claims, 12 Drawing Figures

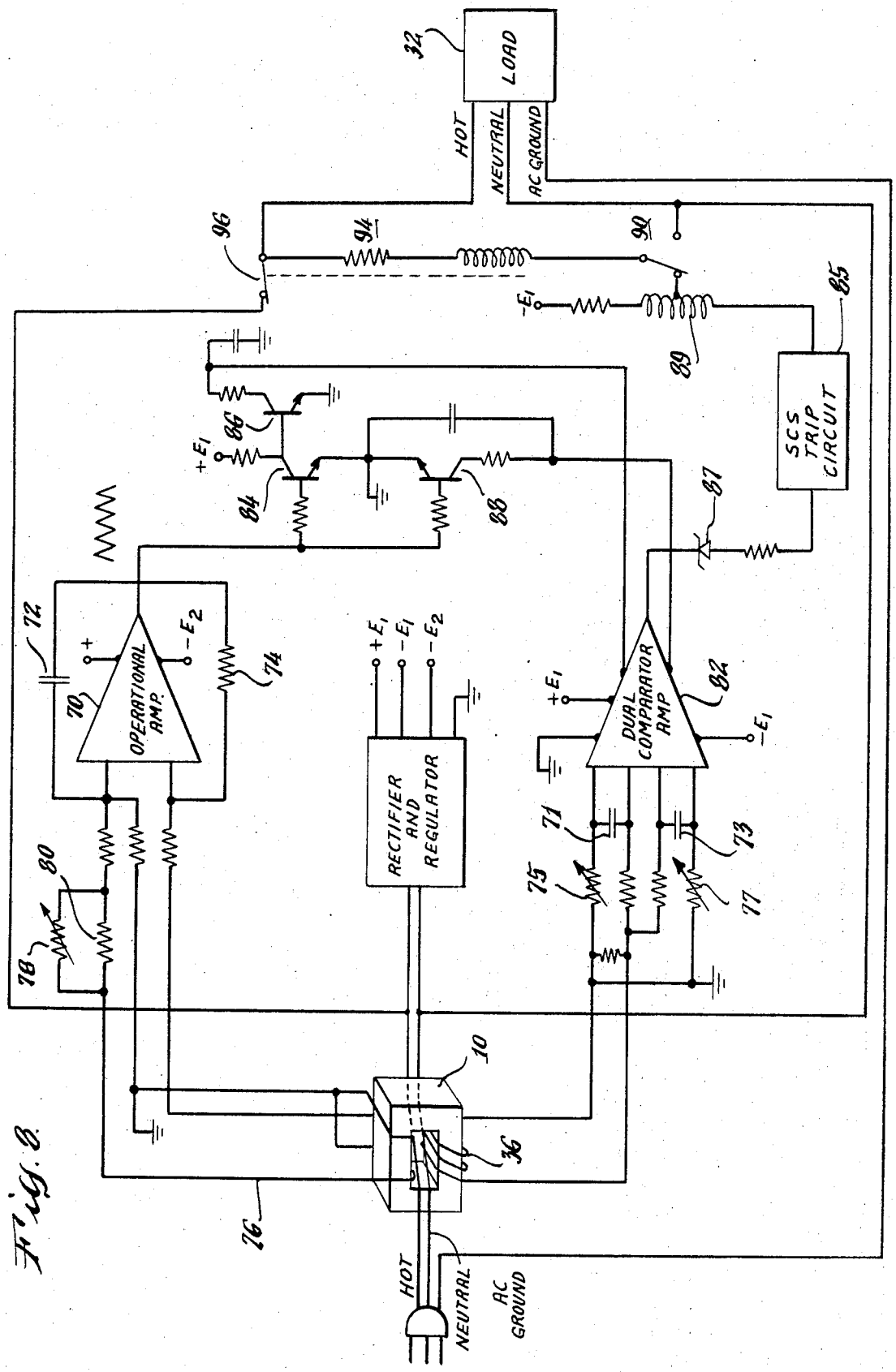

GROUND FAULT DETECTION AND INTERRUPTION APPARATUS

This invention relates to apparatus for sensing an imbalance in electrical current flowing in electrical conductors. The invention relates more particularly to an improved arrangement for sensing a ground current fault and for automatically interrupting the application of electrical power to a utility device upon detection of the ground fault.

Various apparatus are known for sensing differences which occur between the amplitudes of currents flowing in series over power supply and return conductors. A ground fault exists when the amplitude of the current returning to the source over a neutral conduit, for example, is less than the amplitude of the current flowing to the utility device from the power source over a return conductor. This difference between the supply and return current amplitudes can be caused by one or more diversionary parallel circuits which result generally from defective insulation between conductors, by a fault in the utility device, or even as a result of relatively complex or unusual grounding systems. While the difference in amplitude between the supply and return currents is in many instances quite small, this relatively small magnitude can produce a significant and dangerous effect, in certain instances, especially when the utility device comprises an analytical or diagnostic instrument such as is utilized in hospitals and wherein intimate electrical contact is made with a persons body.

Various ground fault detection arrangements have been proposed which detect and automatically interrupt the application of electrical energy to the utility device or load when the difference between supply and return currents exceeds a predetermined level. A characteristic requirement for each of these detection systems is the need to sense a relatively small difference in amplitude between the amplitudes of currents flowing in the conductors when the conductors carry a substantially large current. For example, it is desirable to sense current amplitude differences as small as 5 ma. between supply and return conductors when the conductors are carrying a series current on the order of about 30 amperes. Present day techniques for sensing current amplitude differences on this order generally incorporate a differential transformer having two bifilar wound primary windings and a secondary winding. A magnetic flux $\phi_d$ in a core of the transformer is proportional to the difference in amplitude $i_d$ of the currents in the supply and return leads and a voltage $e_s$ is induced in the secondary winding which is proportional to this difference in current amplitude. The secondary voltage is employed for producing an output signal which energizes a relay or circuit breaker, for example, thereby interrupting the supply of electrical energy to the utility device.

Interruption in the supply of energy to the utility device by energizing a relay or a circuit breaker requires the application of a relatively large amount of power to the device. However, the secondary voltage $e_s$ of a differential transformer generally comprises a relatively low power signal. Various schemes have been employed for utilizing this signal to initiate interruption of power. In one arrangement, a differential transformer having a high ratio of primary to secondary turns and a relatively low reluctance magnetic core circuit is utilized. The voltage which is induced in the primary windings of this transformer is optimized and the turns ratio employed produces a step up in current while still generating sufficient voltage for directly energizing a relatively sensitive reed relay. Sensitivity of the relay is increased by employing a permanent magnet which establishes a bias on the reed relay. However, this arrangement is disadvantageous in one respect in that the transformer employed is relatively bulky because a large number of primary turns must be wound and the apparatus then becomes prohibitively expensive.

Another known ground fault detection arrangement includes a step up transformer for increasing the induced voltage and in addition employs amplifying means for amplifying the induced voltage $e_s$ to a desired signal interval. In view of electrical noise to which this circuit arrangement is susceptible, a means is provided for inhibiting the energization of the circuit breaker or noise or on current differences $i_d$ of relatively small magnitude. This is accomplished by biasing the amplifying means to a level for assuring that the signal generated exceeds a predetermined threshold level before the circuit breaker is energized. However, this arrangement is accompanied by such disadvantages as the need for the careful selection of circuit components as well as by undesirable variations in the characteristics of the components over a range of operating temperatures. For example, the transformer core material, the amplifying devices and the circuit elements employed in this arrangement all exhibit variations in their characteristics over a range of temperatures and when unacceptable variations in sensitivity is to be avoided, care must be taken to provide temperature compensation. This, of course, can greatly increase the cost of apparatus.

Accordingly, it is an object of this invention to provide an improved ground fault detection apparatus.

Another object of the invention is to provide an improved ground fault detection apparatus which exhibits a sensitivity threshold level yet which is nonsusceptible to variations in operating temperatures.

Another object of the invention is to provide an improved ground fault detection and interruption apparatus which is relatively noncomplex.

A further object of the invention is to provide an improved ground fault detection apparatus which is relatively inexpensive.

In accordance with the general features of this invention, an apparatus for detecting a ground fault and for interrupting the supply of electrical energy upon detection of a fault comprises a means for establishing a magnetic flux, $\phi_d$, which is representative of the difference in current amplitude flowing between two conductors, a means for establishing a reference magnetic flux, $\phi_r$, and a means for sensing when $\phi_d$ exceeds $\phi_r$ and for interrupting the application of electrical energy to a utility device when $\phi_d$ exceeds $\phi_r$.

In accordance with more particular features of this invention, a magnetic core is provided and a pair of electrical conductors, which apply electrical current from an electrical power source in series to a utility device, are wound upon the core. The conductors are wound in manner for establishing a flux in the core which is representative of the difference, $i_d$, in the amplitude of currents flowing in the conductors. A secondary sensing winding is wound on the transformer core for providing an output voltage $e_s$ from the core. A reference winding is also wound on the core and a source of current is coupled to the reference winding for causing a current having a ramp shaped wave form segments to flow in the reference winding thereby generating an output voltage at the sensing winding of relatively constant amplitude. This current source supplies to the reference winding a current $i_r$ for establishing the core a reference flux, $\phi_r$, which offsets a flux $\phi_d$, representative of a difference in the amplitude of current flowing in the conductors. The flux $\phi_r$ flowing in the core is polarized so as to be phase opposed to the difference flux $\phi_d$. Amplifying means are provided for amplifying during only a portion of an operating cycle. An output signal $E_o$ is thereby provided which is representative of the difference between the $\phi_d$ and $\phi_r$.

Through this arrangement, the need for accurately controlling the threshold levels or amplifier gain are avoided. Instead, a ground fault current $i_d$ is compared directly with a current $i_r$. A flux thus exists in the magnetic circuit which is the net result of a difference current $i_d$ and the current $i_r$. The net flux causes an induced voltage $e_s$ in the transformer secondary and this voltage is amplified by means which need not be critically controlled and which can be provided by relatively noncomplex amplifying means. Temperature variations in the magnetic properties in the core are no longer significant since both the unknown difference $i_d$ current and the current $i_r$ link the same magnetic core circuit. Furthermore, variations in the amplifying arrangement, whether due to changes in component values over a period of time or due to temperature variations, produce only a second order effect since they affect only the magnitude by which the ground fault current exceeds the calibration current before interruption of electrical energy to the utility device.

There and other objects and features of the invention will become apparent with reference to the following specification and to the drawings wherein.

Figure 1:
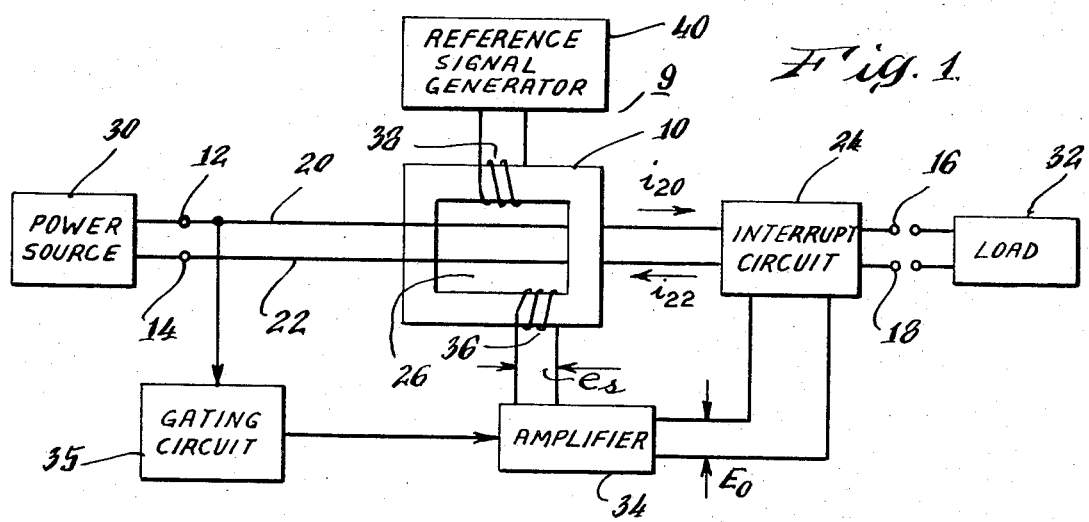
FIG. 1 is a schematic diagram in block form illustrating the general arrangement of a ground fault detection and interruption apparatus constructed in accordance with features of this invention.

Referring now to FIG. 1, a ground fault detection and interruption apparatus 9 in accordance with this invention is shown to include a magnetic circuit comprising a core body 10 formed of a ferromagnetic material. The core 10 represents the core of a differential transformer, for example, which is fabricated of conventional low loss ferromagnetic core materials. Input terminals 12 and 14 are provided for coupling electrical energy to the device 9 from a source 30 and a pair of output terminals 16 and 18 are provided for coupling energy from the device 9 to a load circuit 32. A pair of conductors 20 and 22 are coupled between the terminals 12 and 14 respectively and a power interrupt circuit 24. The interrupt circuit comprises, for example, a circuit breaker. The conductors 20 and 22, which extend through a window 26 in the magnetic core 10 are coupled to contacts of a circuit breaker in the interrupt circuit. When, for example, the circuit 24 is de-energized, the conductors 20 and 22 are connected in series through this circuit to the output terminals 16 and 18 respectively. Electrical energy which is derived from the power source 30 is applied to the load or utility device 32 via the terminals 12 and 14, the conductors 20 and 22, the interrupt circuit 24 and the output terminals 16 and 18. The application of power to the load 32 will be automatically interrupted when a circuit breaker of the interrupt circuit 24 is energized thereby separating contacts and breaking continuity through the device 9 between the input terminals 12 and 14 and the output terminals 16 and 18 respectively. Interruption will occur when a detector circuit means 34, which is coupled to the interrupt circuit 24, energizes the reed relay or circuit breaker. The detector 34 which comprises an amplifier, for example, derives an input signal from a secondary sensing winding 36 which is formed on the magnetic core circuit 10 and which is coupled to the detector.

Although the conductors 20 and 22 each are shown extending through a window 26 in the magnetic core 10 and form one current linking turn, the conductor can be bifilar wound in a conventional manner. The energy source 30 which comprise, for example, a 120 volt 60 cycle alternating current source supplies current to the load 32 through the series coupled conductors 20 and 22. Accordingly, at any moment of time, the electrical energizing current flowing through the conductor 20 for example flows in a direction opposite to the direction of current flowing in the conductor 22. This is illustrated by the arrows representing current flow in FIG. 1. The absence of a fault condition in the load circuit will result in the continuous flow of currents of equal magnitudes in the series coupled conductors 20 and 22. Each of the currents establishes a magnetic flux in the core 10 of equal magnitude but of opposite polarity or direction. Accordingly, the net flux, $\phi_d$, flowing in the core 10 as a result of $i_{20}$ and $i_{22}$ currents of equal amplitude flowing in the conductors 20 and 22 is ultimately zero. When a fault condition exists, the amplitude of current at any one instant in the conductor 20 will differ from the amplitude of current flowing through conductor 22. This difference in current amplitude $i_d$ results in a flux differential, $\phi_d$, in the core 10 and accordingly a voltage $e_s$ representative of the magnitude of this flux differential is generated in the winding 36 and is applied to the detector 34.

In accordance with a feature of this invention, a reference winding 38 is formed on the core 10 and circuit means comprising a source of current 40 is provided for causing a current $i_r$ to flow in the winding 30. This current flows in a direction for establishing a flux, $\phi_r$ which opposes the flux $\phi_d$ resulting from the current differential in the windings 20 and 22. The source 40 provides a current having a magnitude which establishes a reference value of flux. An output voltage is derived from the terminal 12 and is applied to a gating circuit 35 for inhibiting the operation of amplifier 34 during an alternation of the signal. The amplifier 34 is then responsive only to one polarity of alternation of input signals. The generation of an output voltage $e_s$ at the winding 36 is proportional to the difference in the flux $\phi_d$ and $\phi_r$. Accordingly, an output from the amplifier 34 will occur when the amplifier of the different signal exceeds the amplitude of the signal $i_r$.

Figure 2:
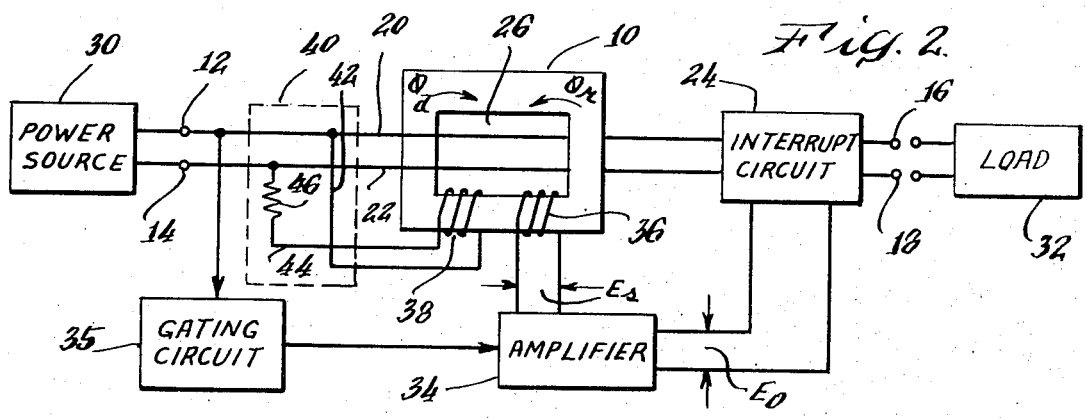
FIG. 2 is a diagram partly in schematic and partly in block form illustrating one embodiment of the ground fault interruption apparatus of this invention.
Figures 3A, 3B, 3C, 3D:
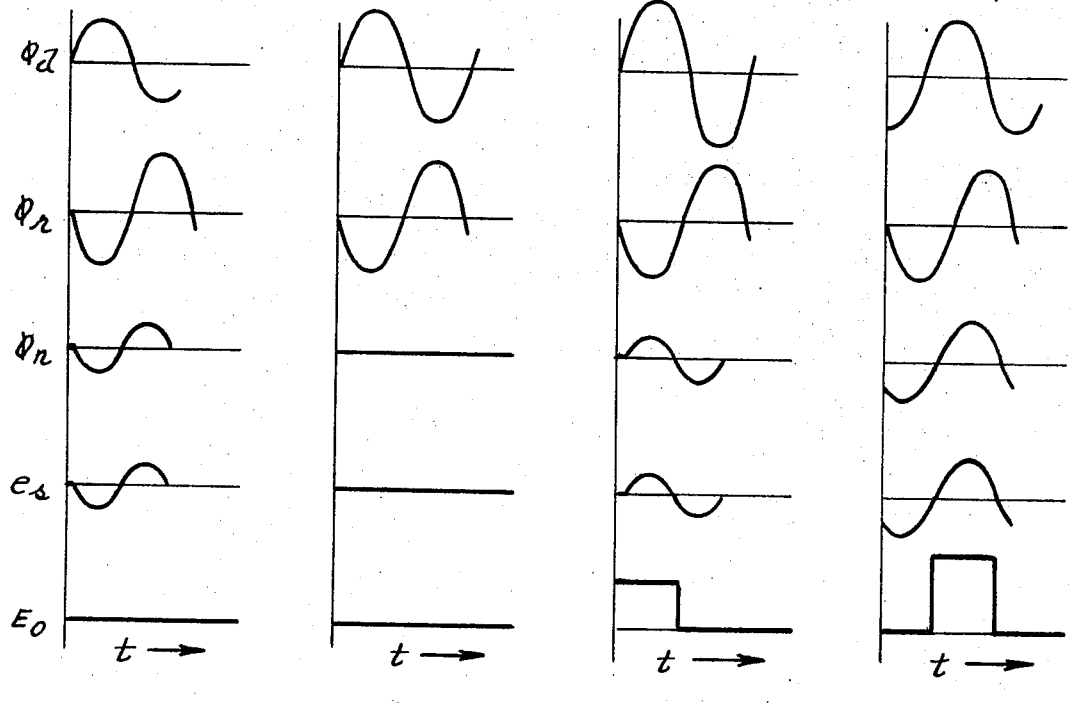
FIGS. 3A–3D illustrate the various waveforms occurring in the arrangement of FIG. 2.

A circuit arrangement wherein the reference signal source 40 comprises means which derives a current $i_r$ from the supply current is illustrated in FIG. 2. Those elements of FIG. 2 which perform the same functions as elements of FIG. 1 bear the same reference numerals. An end 42 of the reference winding 38 is coupled to the conductor 20, or, alternatively to the terminal 12 while another end 44 of this winding is coupled through an impedance 46, shown to comprise a resistance, to the power conductor 22. The resistance 46 is selected to have a magnitude which, in accordance with the potential applied between terminals 12 and 14, will establish a desired magnitude of current $i_r$ for creating a desired magnitude of flux, $\phi_r$ in the core 10. The winding 38 is wound for providing that the reference flux $\phi_r$ is phase opposed to the difference flux $\phi_d$. FIG. 3A illustrates the waveforms of flux and voltage when the reference flux is greater than the difference flux. FIG. 3B illustrates the waveforms of flux and voltage when the reference flux $\phi_r$ is equal in magnitude to the flux $\phi_d$. In this case, both the net flux $\phi_n$ and the output voltage $e_s$ are zero. FIG. 3C illustrates waveforms when the flux $\phi_d$ is significantly large and causes the generation of a load interrupting voltage $E_o$. The amplifier 34 as indicated hereinbefore is biased so as to be responsive to input signals of a particular polarity, for example, a voltage of positive polarity. The amplifier will, for example, be nonresponsive for a half cycle during which interval of time the current $i_r$ of FIG. 2 is positive going. However, the amplifier will be conditioned to provide an output signal when the ground fault current $i_d$ is of a magnitude, on a positive going half cycle, which exceeds the amplitude of the negative going calibration current.

Figure 4:
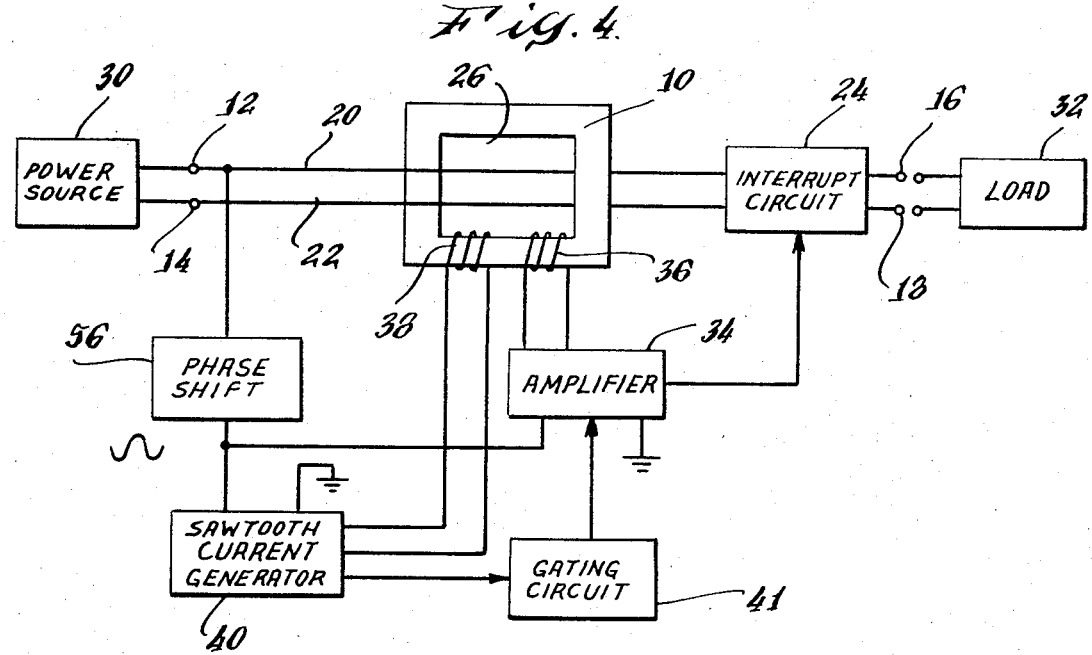
FIG. 4 is a diagram partly in schematic and partly in block form illustrating an alternative embodiment of the ground fault interruption apparatus of this invention.
Figure 5A:
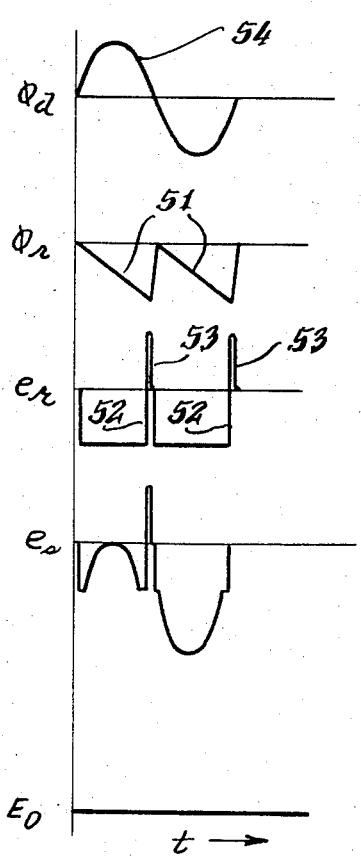
FIGS. 5A and 5B are diagrams illustrating the various waveforms occurring in the apparatus of FIG. 4.
Figure 5B:
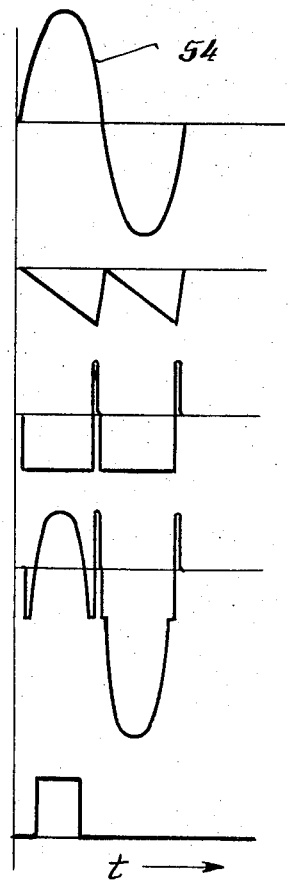

At times, the load 32 may comprise a heavily reactive load under which condition the current flux in the load will be out of phase with the input voltage. The current $i_r$ flowing in the winding 38 of FIG. 2 will then differ in phase from the desired 180° relationship with respect to the load current and under these conditions, it is possible for the amplifier 34 to provide an output signal when the amplitude of the difference $i_d$ is less than the amplitude of the current $i_r$. FIG. 3D illustrates the waveforms when this condition exists. An alternative embodiment of this invention which is useful with both heavily reactive as well as resistive impedance loads and which avoids the faulty output of as shown in FIG. 3D with a heavy reaction load is illustrated in FIG. 4. Those elements of FIG. 4 which perform similar functions as those elements of FIGS. 1 and 2 bear the same reference numerals. In FIG. 4, the current $i_r$ flowing through the reference winding 38 comprises a current having a waveform which includes ramp shaped segments 51 as illustrated in FIG. 5. These ramp shaped current segments are provided when, for example, the reference generator 40 comprises a sawtooth generator which is coupled to the winding 38. The flow of a current having ramp shaped waveform segments in the reference winding causes the generation in the output winding 36 of a pulse of relatively constant amplitude during the occurrence of the ramp. The winding 38 is polarized for providing that the pulse 52, as illustrated in FIG. 5A is of opposite polarity to the positive going alternation 54, for example, of the difference current $i_d$. The generator 40 is gated from the supply voltage through a phase shifting network 56 which shifts the alternating supply signal by about 90°. This phase shifted signal is also coupled to the amplifier 34 for gating the operation of this amplifier. With this arrangement, both the current generator 40 and amplifier 34 are enabled by the gating signal only during the positive going alternation 54 of the fault current. Thus, only those positive going alternations 54 of the fault current which exceed the current $i_d$ in amplitude during this half cycle will cause energization of the circuit breaker and interruption of the application of power to the load 32. The phase shift network 56 comprises a conventional phase shifting network for establishing time coincidence between the pulse 52 and the positive alternation 54 of the difference current. Use of this phase shifting network permits sensing of difference current differing in phase by ±90° from the reference signal to be detected. FIG. 5A illustrates waveforms occurring when the flux produced by the difference and reference currents results in a resultant zero output voltage $E_o$ while FIG. 5B illustrates waveforms occurring when the difference current $i_d$ exceeds the magnitude of the current and an output voltage $E_o$ is generated.

A flyback pulse 52 is generated along with the ramp signals 51 when rapid decreases and the magnitude of the flux $\phi_r$ periodically occurs. This pulse can interfere with proper protection. In order to eliminate the effects of this pulse, a gating circuit 41 is provided for disabling amplifier 34 during the occurrence of this pulse. The circuit 41 includes conventional conventional means for sensing a rapidly increasing pulse of known polarity and for accordingly inhibiting the amplifier 34.

Figure 6:
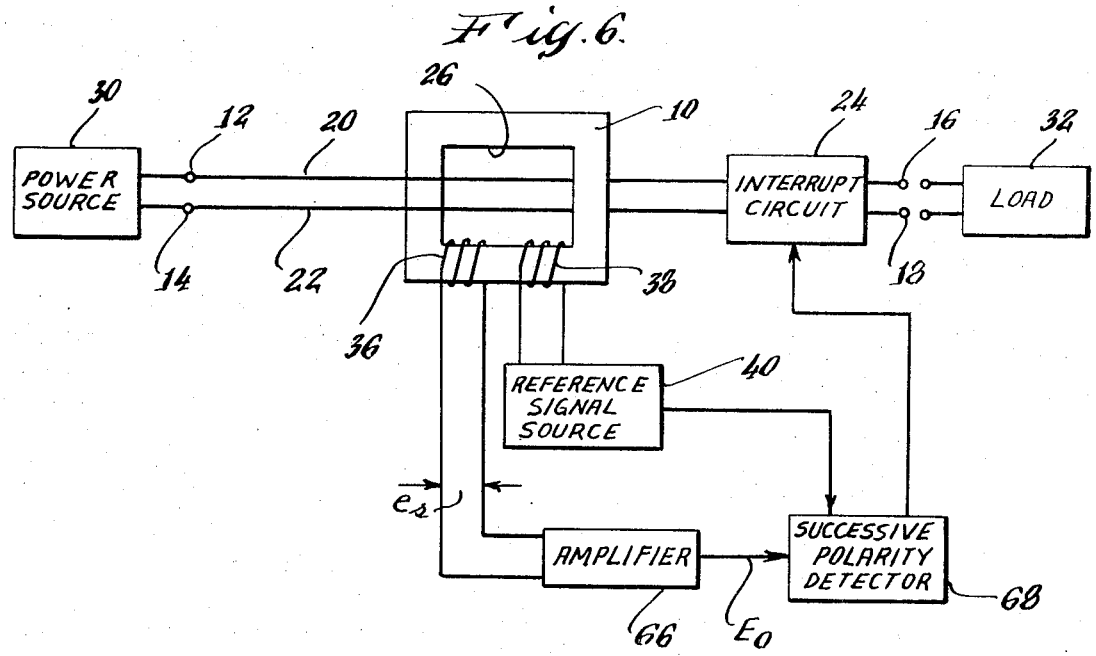
FIG. 6 is a diagram partly in schematic and partly in block form of still another embodiment of the ground fault interruption apparatus of this invention.
Figure 7:
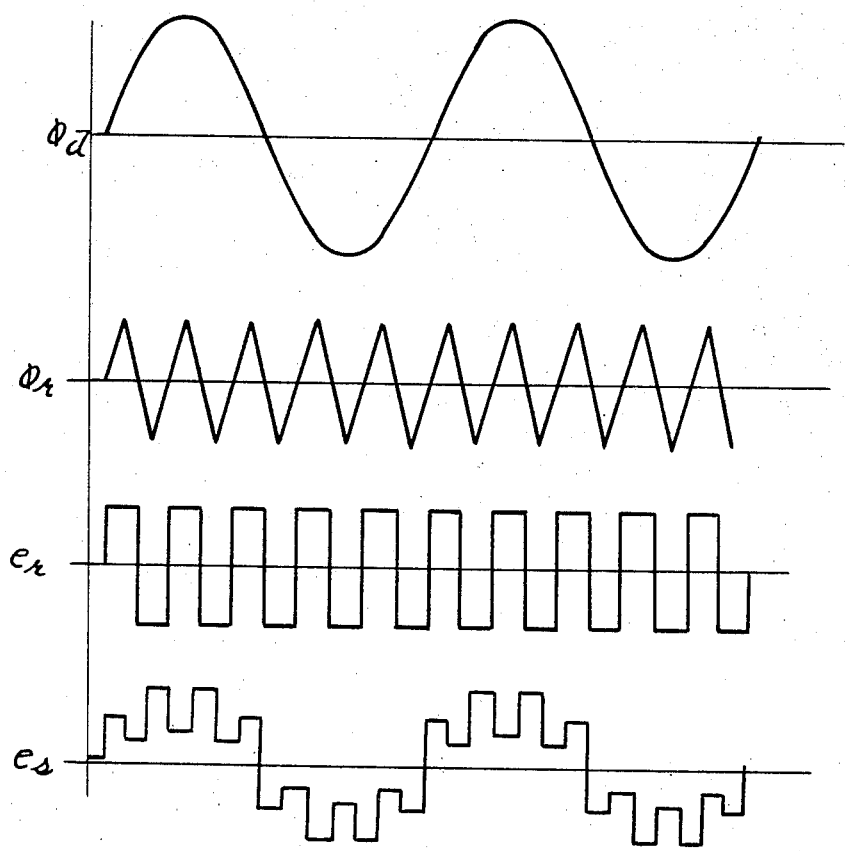
FIG. 7 is a diagram illustrating wave forms occurring in the apparatus of FIG. 6; and, FIG. 8 is a detailed circuit diagram illustrating one arrangement of the apparatus of FIG. 6.

FIG. 6 illustrates an alternative embodiment of the ground fault apparatus of this invention wherein the current $i_d$ which occurs more than +90° or more than −90° out of phase with the line voltage is detected and wherein the use of a phase shift network 56 of FIG. 4 is avoided. In the arrangement of FIG. 6 those elements which perform similar functions as elements illustrated in FIGS. 1, 2, and 4 bear the same reference numerals. The apparatus of FIG. 6 includes a current generator 40 which generates a current having a triangular shaped waveform and which occurs at a frequency which is substantially greater than the operating frequency of the energizing potential provided by the source 30. For example, when the source 30 provides a potential having a frequency on the order of 60 cycles, the reference current generator 40 of FIG. 6 will provide a triangular shaped current having a frequency on the order of about 1000 cycles. The output voltage $e_s$ at the sensing winding 36 due to the triangular shaped current in the primary winding is a succession of pulses 62 and 64 of alternating polarity. In view of the relatively high frequency of this current with respect to the difference current, a large number of the pulses 62 or the pulses 64 will occur during any half cycle of the difference current. When a difference current does not exist, or a difference current does exist but its amplitude does not exceed the amplitude of the current $i_r$, then the output voltage at the winding 36 will comprise a series of pulses of successively alternating sign. However, when the difference current amplitude exceeds the amplitude of the current $i_r$ for a significant period of time, as is illustrated in FIG. 7, then a series of successively occurring output pulses of the same polarity, positive going during the positive half cycle and negative going during the negative half cycle of alternation of the fault current will occur. A sensing amplifier 66 is adapted to provide an output voltage $E_o$, as illustrated in FIG. 7, which is coupled to a logical circuit arrangement 68 which senses the occurrence of successively occurring positive or successively occurring negative pulses. As indicated hereinafter with respect to FIG. 8, the functions of amplifier 66 and polarity detector 68, when properly enabled can be performed by an operational amplifier. Upon detection of this condition, the detector 58 energizes the power application interruption circuit 24 and interrupts the application of electrical energy to the load 32.

A schematic circuit arrangement of this ground fault detection and interruption apparatus of FIG. 6 is illustrated in FIG. 8. The current generator for providing a current having a periodically recurring triangular waveform with ramp shaped segments comprises an operational amplifier 70 with capacitive, positive, unity feedback and resistive feedback providing less than unity, negative feedback for stabilizing the bias level. The capacitive feedback is provided by a capacitance 72 while resistive feedback is provided by a resistance 74. The resultant feedback currents are subtracted in a fifilar-wound transformer winding 76 to produce a triangular flux verses time waveform. The frequency of operation is determined by the resistive feedback ratio and time constant of the capacitive feedback. The shape of the waveform is controlled by adjusting the fraction of capacitve feedback current linked to the transformer through an adjustable resistive impedance provided by a rheostat 78 which is coupled in parallel with the resistance 80. This impedance is coupled in series with the reference winding.

The detection amplifier comprises a dual comparator differential amplifier 82. Differential inputs are coupled in an opposite sense to the differential transformer 10 so that either half cycle of difference current appears as a single polarity signal to one of two comparator sections of the differential amplifier but with the reference signal subtracted. Only one polarity of output signal can cause a response in either comparator output. A coincident AND circuit is effectively provided at the input of the comparator amplifier 82 and requires as inputs, an output signal of the transformer sensing winding 36 and an input from an enabling circuit which derives its output from the amplifier 70. The latter circuit includes transistor amplifiers 84 and 86 which enable one section of the dual comparator 82 on one half cycle and a transistor amplifier 88 which enables another section of the dual comparator on an alternate half cycle of the amplifier signal from amplifier 70. Input capacitors 71 and 73 are coupled between amplifier inputs in order to reject noise transients. Input resistances 75 and 77 are also provided and are made adjustable in order to provide for balancing of the inputs.

An output of the comparator amplifier 82 is coupled to a silicon controlled switching circuit 85 through a level setting Zener diode 87. Energization of the SCS circuit causes energization of a reed relay coil 89. Line potential is then applied to a coil 92 of a circuit breaker 94 and line voltage interruption switch 96 is thereby tripped and interrupts application of power to the load 32.

There has been described an improved ground fault protection and interruption circuit arrangement which advantageously provides for a reference level flux thereby eliminating prior disadvantages accompanying the variation in characteristics of circuit components with temperature changes in the apparatus. While the amplitude of current in excess of the threshold level may be subject to slight variation, the relative amplitude of the threshold level will be maintained constant.

While I have described and illustrated particular embodiments of my invention, it will be apparent to those skilled in the art that various modifications may be made thereto without departing from the spirit of the invention and the scope of the appended claims.

What is claimed is:

1. An apparatus for detecting a ground fault and for interrupting the supply of electrical energy upon detecting a fault comprising:
   circuit means including a pair of conductors for coupling electrical energy between a pair of input terminals and a pair of output terminals;
   a body of ferromagnetic material;
   said conductors intercoupled with said body of ferromagnetic material for establishing a magnetic flux $\phi_d$ exceeds flux $\phi_r$; and
   circuit means coupled to said sensing means for interrupting the coupling of electrical energy between said input and output terminals when said flux $\phi_d$ exceeds said flux $\phi_r$;
   said means for establishing a magnetic flux $\phi_r$ including a winding formed on said magnetic body and a reference signal source coupled to said winding, and said sensing means including a sensing winding formed on said magnetic body and amplifying means coupled between said sensing means and a circuit interruption means;
   said reference signal source comprising means for generating a current having a wave shape which establishes an output voltage at said sensing winding of relatively constant magnitude;
   said reference signal source providing a sawtooth current having a frequency substantially equal to the frequency of the energizing current and having a waveform including a ramp shaped segment.

2. The apparatus of claim 1 including means for enabling said sensing amplifier during a portion of said energizing cycle.

3. The apparatus of claim 2 wherein means are provided for deriving said enabling potential from said energizing current.

4. The apparatus of claim 3 wherein said means for deriving said enabling potential from said energizing potential includes means for phase shifting the enabling potential with respect to the energizing potential.

5. The apparatus of claim 4 wherein said phase shifting means provides a relative phase difference of between +90 and −90°.

6. An apparatus for detecting a ground fault and for interrupting the supply of electrical energy upon detecting a fault comprising:

circuit means including a pair of conductors for coupling electrical energy between a pair of input terminals and a pair of output terminals;

a body of ferromagnetic material;

said conductors intercoupled with said body of ferromagnetic material for establishing a magnetic flux $\phi_d$ exceeds said flux $\phi_r$;

circuit means coupled to said sensing means for interrupting the coupling of electrical energy between said input and output terminals when said flux $\phi_d$ exceeds said flux $\phi_r$;

said means for establishing a magnetic flux $\phi_r$ including a winding formed on said magnetic body and a reference signal source coupled to said winding, and said sensing means including a sensing winding formed on said magnetic body and amplifying means coupled between said sensing means and a circuit interruption means;

said reference signal source comprising a circuit arrangement for generating a current waveform having a ramp shaped segment and having a frequency which is substantially greater than the frequency of the energizing current; and circuit means for sensing the occurrence of successively occurring electrical pulses having the same polarity and a frequency equal to the frequency of said current.

* * * * *